United States Patent [19]

Saracsan

[11] 4,021,414

[45] May 3, 1977

[54] SULFURIC ACID-RESISTANT POLYURETHANE COMPOSITION AND METHOD OF PREPARATION

[75] Inventor: Jeffrey W. Saracsan, Akron, Ohio

[73] Assignee: The Goodyear Tire & Rubber Company, Akron, Ohio

[22] Filed: Mar. 9, 1976

[21] Appl. No.: 665,215

Related U.S. Application Data

[62] Division of Ser. No. 534,936, Dec. 20, 1974, Pat. No. 3,942,672.

[52] U.S. Cl. .................. 260/77.5 AM; 260/75 NH; 260/77.5 AP; 260/77.5 CR; 260/77.5 SS; 428/35; 428/425; 428/457
[51] Int. Cl.$^2$ .................. C08G 18/62; C08G 18/32
[58] Field of Search ............ 260/75 NH, 77.5 AM, 260/77.5 SS, 77.5 CR

[56] References Cited

UNITED STATES PATENTS

| | | | |
|---|---|---|---|
| 3,674,743 | 7/1972 | Verdol | 260/77.5 CR |
| 3,734,880 | 5/1973 | Finelli | 260/77.5 SS |
| 3,926,919 | 12/1975 | Finelli | 260/77.5 AM |
| 3,940,371 | 2/1976 | Case | 260/77.5 AM |

*Primary Examiner*—H.S. Cockeram
*Attorney, Agent, or Firm*—F. W. Brunner; Young, Jr. H. C.

[57] ABSTRACT

A polyurethane composition, resistant to sulfuric acid, prepared by reacting 2,2'-diaminodisulfide with an isocyanate-terminated prepolymer, itself prepared by reacting, in the presence of a 2,6-dialkylated para cresol, at least one polymeric polyol with a diphenyl methane diisocyanate.

3 Claims, No Drawings

SULFURIC ACID-RESISTANT POLYURETHANE COMPOSITION AND METHOD OF PREPARATION

This is a division of application Ser. No. 534,936, filed Dec. 20, 1974, now U.S. Pat. No. 3,942,672.

This invention relates to a polyurethane composition and to a method for its preparation.

Polyester and polyether polyurethane compositions generally degrade excessively when exposed to sulfuric acid and thus typically are not used for applications which require contact with sulfuric acid for extended periods of time, particularly at elevated temperatures.

Polyurethane compositions have been disclosed as being resistant to phosphoric acid (U.S. Pat. No. 3,734,880) which are prepared by primary diamine curing a prepolymer formed from the reaction of a selected diisocyanate with a selected polyol in the presence of a 2,6-dialkylated para cresol. The preferred diamine was 4,4'-methylene-bis (2-chloroaniline). However, particularly for large metal storage containers which are subject to wide ranges of temperatures which cause various expansions and contractions of the basic metal structure, interior coatings of lower modulus, thus greater elasticity, are needed in addition to necessary sulfuric acid resistance.

Therefore, it is an object of this invention to provide a polyurethane composition which is resistant to sulfuric acid and to provide a method for its preparation.

In accordance with this invention, it has been discovered that a polyurethane composition resistant to sulfuric acid comprises a composition prepared by the method which comprises reacting 2,2'-diaminodiphenyldisulfide with a prepolymer having a free isocyanate content of about 2 to about 8 percent prepared by reacting in the presence of from about 1 to about 5 parts by weight of a 2,6 dialkylated para cresol having the formula

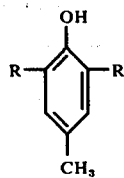

where R is an alkyl radical having from 4 to 12 carbon atoms; (1) 100 parts by weight of an hydroxyl containing polymeric polyol having a molecular weight of from about 1000 to about 5000, a corresponding hydroxyl number of from about 110 to about 20 and an hydroxyl functionality of from about 2 to about 3 and where the polymeric polyol comprises from about 70 to about 100 percent units derived from conjugated dienes selected from the group consisting of 1,3-butadiene and isoprene and up to about 30 percent units derived from styrene, and (2) a diphenyl methane diisocyanate, where the ratio of primary amino groups of said diaminodisulfide to free isocyanato groups of said prepolymer is in the range of about 05./1 to about 1/1.

Uniquely, the aromatic diaminodisulfide provides a cured polyurethane prepolymer both resistant to sulfuric acid and having a favorable 100 percent modulus for adherent inner liners for metal storage tanks.

Therefore, in further accordance with this invention, a container, suitable for storing sulfuric acid, is prepared which comprises a rigid metal container having an adherent inner liner with a thickness in the range of about 3 to about 100 mils comprised of said 2,2'-diaminodiphenyldisulfide cured prepolymer polyurethane of this invention.

In the practice of this invention it is usually preferred that the hydroxyl containing polymeric polyol has a molecular weight of from about 2000 to about 4000 and a corresponding hydroxyl number of from about 50 to about 25. The polyol can also be characterized by having an equivalent weight in the range of about 1100 to about 1500. The hydroxyl terminated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have an hydroxyl functionality of from about 2 to about 3 and usually from about 2.1 to about 2.8. The preferred hydroxyl containing polymeric polyols are polybutadiene polyols, polyisorpene polyols, and butadiene-styrene copolymer polyols having about 80 to 90 percent units derived from butadiene and about 20 to 10 percent units derived from styrene.

The diphenyl methane diisocyanates used in this invention include the isomers and mixtures of isomers of diphenyl methane diisocyanate such as the 4,4'- and 2,4-isomers which are normally solid at temperatures above 15° C and the so-called liquid diphenyl methane diisocyanates of the type treated with from about 0.1 to about 3 percent by weight of a trihydrocarbyl phosphate such as the trialkyl phosphates exemplary of which are triethyl, tripropyl, triisobutyl, and trihexyl phosphates and also triphenyl and tribenzyl phosphates having an isocyanate equivalent of from about 125 to about 200. The diisocyanate equivalent of the diisocyanate is determined by ASTM D1638-60-T modified by heating the test sample to reflux in dry toluene in the presence of dibutylamine and holding the mixture at reflux for 45 minutes before cooling and continuing with the test procedure.

Representative of the 2,6 dialkylated para cresols are para cresol 2,6 dialkylated with alkyl radicals having from 4 to 12 carbon atoms and preferably from 4 to 6 carbon atoms. Examples of such alkyl radicals are butyl, tertiary butyl, amyl, tertiary amyl, hexyl, tertiary hexyl, heptyl, tertiary heptyl, octyl, tertiary octyl, nonyl, tertiary nonyl, decyl, tertiary decyl, undecyl, tertiary undecyl, dodecyl and tertiary dodecyl radicals. A preferred dialkylated para cresol is 2,6-ditertiary butyl para cresol and 2,6-ditertiary hexyl para cresol.

The prepolymer is conveniently prepared by reacting the hydroxyl containing polymeric polyol with a diphenyl methane diisocyanate in the presence of the 2,6 dialkylated para cresol to provide a prepolymer having an isocyanate content of from about 2 to about 8 percent free isocyanate groups. It is the preferred practice of this invention to mix the 2,6 dialkylated para cresol with the hydroxyl containing polymeric polyol and heat the mixture to a temperature of from about 40° C to about 100° C to reduce the viscosity of the polymeric polyol and dissolve the substituted para cresol. A reduced pressure of less than about 760 millimeters of mercury can then be applied for a few minutes to remove possible traces of water which a commercial grade of the hydroxyl containing polymeric polyol may contain. The diphenyl methane diisocyanate is then mixed with the mixture and the reaction allowed to proceed for about 30 to about 60 minutes at a temperature of from about 50° C. It is then usually preferred to dilute the prepared prepolymer with a solvent to provide a prepolymer solution having from about a 30 to about 70 percent by weight solids content.

Immediately before use a solution of the diaminodisulfide curative is mixed with the prepolymer solution to form the polyurethane reaction mixture. If desired, the curative solution can contain a portion of the substituted para cresol and also a catalyst or accelerator to promote the rate of curing of the polyurethane reaction mixture. Various catalysts or accelerators can be used and representative examples are shown is U.S. Patent application having Ser. No. 393,779 filed Sep. 1, 1964. A preferred class of accelerators is the 2-mercaptothiazoles such as 2-mercaptobenzothiazole.

The polyurethane reaction mixture is then usually allowed to cure at a temperature of from about 25° C to about 100° C for about 1 to about 75 hours. If a catalyst or accelerator is used to promote the reaction of the polyurethane reaction mixture the curing temperature time can be reduced.

Various nonreactive solvents known to those skilled in the polyurethane art can be used for the preparation of the prepolymer solutions and polyurethane reaction mixtures. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures of this invention are to be used to prepare the cured polyurethanes in confined areas which are subject to explosive hazards, nonflammable chlorinated solvents can be used to form nonflammable prepolymer solutions and polyurethane reaction mixtures. Representative examples of such solvents are chloro-substituted olefins such as dichloroethylene, trichloroethylene, and 1,1,2,2-tetrachloroethylene; and chloro-substituted saturated hydrocarbon compounds such as methyl chloroform, dichloroemthane, 1,2-dichloroethane, trichloroethane, and 1,1,2,2-tetrachloroethane. Trichloroethylene is particularly useful. Mixtures of the solvents may be used to obtain satisfactory solubilities, rates of solution, spreading properties and evaporation rates, particularly when the polyurethane is to be used as a spray composition and applied to a suitable surface.

If desired, various pigments and leveling and reinforcing agents such as particulate carbon blacks and titanium dioxide can be added to the hydroxyl containing polymeric polyol, prepolymer or prepolymer solution. Carbon black is especially preferable. The preferred carbon blacks are oil furnace carbon blacks. When such a pigment or carbon black is added, it is usually added in an amount from about 0.5 to 50 parts and preferably, in the amount from about one to about twenty parts of carbon black or pigment per hundred parts of prepolymer by weight. The carbon black usually has an average particle diameter of from about 15 to about 100 millimicrons and the titanium dioxide usually has a particle size of from about .2 to about 1.0 microns.

The following examples further illustrate the invention and are not intended to be limiting. The parts and percentages are by weight unless otherwise indicated.

EXAMPLE I

A polyurethane prepolymer composite was prepared by the following method: To a suitable reactor was charged 100 parts of an hydroxyl containing polybutadiene polyol having an equivalent weight of about 1300, 3 parts 2,6-ditertiary butyl para cresol and 5 parts carbon black obtainable as Raven 40 from The Columbian Carbon Co. The mixture was slowly heated to about 60° C while stirring. To this masterbatch was added and mixed liquid diphenyl methane-4,4'-diisocyanate in a ratio of 3.5 moles diisocyanate to one mole of said polyol. Immediately external heating was stopped. With continued stirring the exotherm of the reaction caused the temperature of the mixture to rise to a maximum of about 72° C over a 30 minute time span. By the time 40 minutes had elapsed the temperature had already begun to drop. The product was diluted in the ratio of 2:1:1 with toluene and methyl ethyl ketone (50% solids). The dilute material was smooth and homogeneous. It was allowed to stand overnight and an NCO (free isocyanate) determination was made. The percent free NCO of the diluted product was 2.7, but can typically range between 2.7 and 3.1.

A 2,2'-diaminodiphenyldisulfide solution was prepared by mixing, with stirring, and heating 25 parts of said diaminodisulfide and 75 parts methyl ethyl ketone.

A coating was prepared by first mixing 13 parts of said diaminodisulfide solution with 50 parts of said polybutadiene prepolymer composite followed by quickly pouring the mixture onto a polyethylene slab and drawing a film thereof. The mixture itself demonstrated a pot life of about 50 minutes. The drawn or cast film was essentially tack free after about 22 minutes in an atmosphere of about 25° C. The film, which had a thickness of about 18 mils, was allowed to continue to air cure at about this temperature. An analysis of the film's physical properties was made at about 25° C by ordinary rubber testing procedures with the following results more clearly shown in Table 1.

TABLE 1

| Property | Value |
|---|---|
| 100% Modulus (psi) | 1600 |
| Tensile, ultimate (psi) | 2400 |
| Elongation, ultimate (%) | 200 |

Strips of the 18 mil thick film were placed in 25 percent sulfuric acid and heated in a oven to 70° C for 28 days. The strips were removed and tested, showing excellent retention of physical properties as typically demonstrated in Table 2, with only a very small weight loss.

TABLE 2

| Property | | Value |
|---|---|---|
| 100% Modulus (psi) | | 1800 |
| Ultimate tensile (psi) | | 2400 |
| Ultimate elongation (%) | | 150 |
| Percent weight change (%) | (-) | 0.4 |

EXAMPLE II

To especially demonstrate the utility of this invention, a 15,000 gallon capacity railroad metal tank car to be used for transporting 25% sulfuric acid, lined with the polyurethane of this invention, is described in the following manner.

The inner surface of the metal tank car is prepared by shot blasting followed by spray coating with a primer solution. The primer solution can comprise an adhesive mixture of resins of the thermosetting class comprising polyvinyl butyral resin and the phenolic type in a solvent mixture comprising isopropanol and toluene of the type obtainable from The Conap Company as Conap1146-C primer. The primer can be allowed to dry for about 12 hours at about 25° C.

Multiple spray coats of a polyurethane reaction mixture is spray coated onto the prepared inner surface of the tank car and allowed to cure at about 25° C to form a built-up protective inner liner in the tank car having a thickness of at least about 0.05 inches or at least about 50 mils.

The prepolymer for sprayable polyurethane mixture is prepared as follows.

To a suitable reactor is charged 34.7 parts of a mixture consisting of 80 percent by weight of the hydroxyl containing polybutadiene polyol used in Example I and 20 percent by weight of the oil furnace black and 71.3 additional parts of the hydroxyl containing polybutadiene polyol.

To the polyol-carbon black mixture is added 2.9 parts of 2,6-ditertiary butyl para cresol and the resulting mixture heated to about 50° C and stirred for about 40 minutes.

Then 41.1 parts of a liquid diphenyl methane diisocyanate having a molecular weight of about 288 is added to the heated mixture and the reaction exotherm should cause the temperature to increase somewhat. This is followed by the addition of 75 parts of toluene and 75 parts of methyl ethyl ketone to form a prepolymer solution having a 2.85 percent free isocyanate content.

A sprayable polyurethane reaction mixture is formed by mixing with 9080 parts of the prepared prepolymer solution at about 25° C, 2190 parts of a curative solution which consists of

|  | Parts |
| --- | --- |
| 2,2'-diaminodiphenyldisulfide | 51.0 |
| 2,6-ditertiary butyl para cresol | 3.0 |
| 2-mercapotbenzothiazole | 0.3 |
| methyl ethyl ketone | 90.0 |
|  | 144.3 |

The polyurethane composition of this invention are generally characterized by having less than about a 10 percent weight increase when exposed to a 25 percent sulfuric acid at 70° C for about 28 days. Thus, they are useful for applications which require exposure to sulfuric acid for extended periods of time. It is understood that the polyurethanes referred to in this specification may also contain polyurea linkages.

Where polyurethane compositions are used as structures, to contain sulfuric acid, it is desired that the polyurethanes do not increase in weight by more than about 10 percent when immersed in the sulfuric acid at a temperature of about 70° C for about 28 days. It is generally considered that polyurethanes exceeding a 10 percent weight increase under these conditions are unsuitable for the normal storage of sulfuric acid because of their tendency to allow the acid to seep through the polyurethane barrier, thereby causing a loss of the acid and damage to surrounding structures.

Sprayable liquid polyurethane reaction mixtures can be prepared by the method of this invention which are particularly useful for preparing seamless protective innerliners for storage containers such as containers used for storing sulfuric acid because of both their resistance to degradation by the mineral acid and their advantageous low 100% modulus which demonstrates their elasticity. This is especially useful for large storage tanks of at least 1000 gallon capacity which are subject to environments of expansion and contraction due to wide temperature ranges.

Nonflammable sprayable solutions of the polyurethane reaction mixtures prepared with the chlorinated solvents can be used to coat surfaces of materials in confined areas such as the inner surfaces of storage containers without incurring explosive hazardous conditions. Such surfaces can be of metal, cement, wood, plastics, and other materials to support the coats of polyurethane. When used as protective innerliners for storage containers for sulfuric acid the layers of the polyurethane composition should have a thickness of at least about 3 and preferably of from about 5 to about 100 mils.

Generally the interior surface of a storage tank is cleaned with a suitable solvent such as an aliphatic or aromatic hydrocarbon or with an inorganic acid or base, by steam, by shot or sand-blasting, or a combination of these methods before the polyurethane reaction mixture solution is applied. It is usually desired to apply the solution by spray coating. If desired, a bonding cement can be applied to the surface of the container in order to enhance the bonding of the polyurethane composition to the inner surface of the container. It is usually preferred to mix carbon blacks or titanium dioxide with the polyurethane reaction mixture to enhance its thixotropic properties and to provide a cured polyurethane innerliner relatively free of pinholes.

It should be pointed out that the preferred composition of this invention, as particularly practiced in the examples, is preferably for use in the preparation of storage containers for sulfuric acid which requires first forming a prepolymer by reacting the polymeric polyol with a diphenyl methane diisocyanate in the presence of the 2,6-dialkylated paracresol and then curing said prepolymer by reacting with the prescribed diaminodisulfide.

In this specification the term free isocyanato groups refer to NCO units in the prepolymer of polyurethane reaction mixture that are free for reaction with compounds having reactive hydrogens.

While certain representative embodiments and details have been shown for the purpose of illustrating the invention, it will be apparent to those having skill in this art that various changes may be maded therein without departing from the spirit or scope of the invention.

What is claimed is:

1. A polyurethane composition, resistant to sulfuric acid, characterized by having less than about a 10 percent weight increase when immersed in a 25 percent sulfuric acid at 70° C. for 28 days, where the said composition is prepared by the method which comprises
   a. mixing a 2,6-dialkylated para cresol having alkyl radicals with 4 to and including 6 carbon atoms, with a polybutadiene polyol at a temperature of from about 40° C. to about 100° C. and sufficient to melt the said polyol, b. reacting a diisocyanate selected from at least one of diphenyl methane 4,4'-diisocyanate and diphenyl methane 2,4-diisocyanate with the mixture to form a prepolymer having a free isocyanate content of about 2 to about 8 percent, c. dissolving the prepolymer in a nonreactive solvent to form a sprayable prepolymer solution, and d. curing the prepolymer by mixing with the prepolymer solution at a temperature of from about 25° C. to about 100° C. a solution in nonreactive solvent of 2,2'-diaminodiphenylidisulfide; where polybutadiene polyol has a molecular weight of from about 1000 to 5000, a corresponding hydroxyl number of from about 110 to about 20 and a hydroxyl functionality of from about 2.1 to about 2.8 and where the ratio of primary amino groups of said diaminodisulfide to free isocyanato groups of said prepolymer is in the range of about 0.5/1 to about 1/1.

2. The polyurethane composition according to claim 1 where said polybutadiene polyol has a molecular weight of about 2000 to about 4000 and where said 2,6-dialkylated para cresol is 2,6-ditertiary butyl para cresol.

3. The polyurethane composition of claim 1 where the prepolymr solution has mixed therewith about 0.5 to about 50 parts by weight per 100 parts by weight of prepolymer of at least one pigment selected from the group consisting of carbon blacks having an average particle diameter of from about 15 to about 100 millimicrons and titanium dioxide having a particle size of from about 0.2 to about 1.0 micron.

* * * * *